(12) United States Patent
Tsunoda

(10) Patent No.: US 8,302,051 B2
(45) Date of Patent: Oct. 30, 2012

(54) SYSTEM AND METHOD FOR EXTRACTING PARASITIC ELEMENTS

(75) Inventor: Hiromitsu Tsunoda, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 163 days.

(21) Appl. No.: 12/882,453

(22) Filed: Sep. 15, 2010

(65) Prior Publication Data

US 2011/0066991 A1 Mar. 17, 2011

(30) Foreign Application Priority Data

Sep. 16, 2009 (JP) ................................ 2009-214894

(51) Int. Cl.
 G06F 17/50 (2006.01)
(52) U.S. Cl. ......................... 716/111; 716/132; 716/136
(58) Field of Classification Search .................. 716/111, 716/132, 136
See application file for complete search history.

(56) References Cited

U.S. PATENT DOCUMENTS

| 5,322,438 | A | * | 6/1994 | McNutt et al. ................ 716/115 |
| 6,028,991 | A | * | 2/2000 | Akashi ......................... 716/115 |
| 6,463,571 | B1 | * | 10/2002 | Morgan ........................ 716/115 |
| 6,530,066 | B1 | * | 3/2003 | Ito et al. ........................ 716/113 |
| 6,581,195 | B2 | * | 6/2003 | Tanaka .......................... 716/115 |
| 6,704,697 | B1 | * | 3/2004 | Berevoescu et al. ............. 703/19 |
| 6,766,498 | B2 | | 7/2004 | Sharma et al. |
| 7,694,269 | B2 | * | 4/2010 | Savithri et al. .................. 716/50 |
| 2002/0056070 | A1 | * | 5/2002 | Tanaka ............................ 716/2 |
| 2003/0237070 | A1 | * | 12/2003 | Tomita et al. ................... 716/12 |
| 2008/0028353 | A1 | * | 1/2008 | Lu et al. ......................... 716/13 |
| 2008/0141208 | A1 | * | 6/2008 | Hirota ............................ 716/14 |

FOREIGN PATENT DOCUMENTS

| JP | 08123829 A | * | 5/1996 |
| JP | 10312408 A | * | 11/1998 |
| JP | 2005-537566 A | | 12/2005 |

* cited by examiner

*Primary Examiner* — Phallaka Kik
(74) *Attorney, Agent, or Firm* — Sughrue Mion, PLLC

(57) ABSTRACT

A parasitic element extracting system includes: a classifying section configured to classify each of interconnection layers of a layout structure of a semiconductor device into one of an upper interconnection layer and an lower interconnection layer based on a predetermined criterion; and a marker producing section configured to generate a marker to indicate a via-contact connecting the upper interconnection layers and the lower interconnection layers. An upper layer parasitic element list producing section is configured to generate an upper layer parasitic element list by extracting parasitic elements in the upper interconnection layers based on a first criterion, and a lower layer parasitic element list producing section is configured to generate a lower layer parasitic element list by extracting parasitic elements in the lower interconnection layers based on a second criterion which is different from the first criterion. A parasitic element list producing section is configured to generate a parasitic element list of the layout by combining the upper layer parasitic element list and the lower layer parasitic element list by using the markers.

12 Claims, 8 Drawing Sheets

Fig. 4A

| | | | | |
|---|---|---|---|---|
| R21 | N1 | N2 | 20 | (1) |
| R22 | N2 | VDD_V45_100_250 | 5 | (2) |
| | | : | | |

Fig. 4B

| | | | | |
|---|---|---|---|---|
| R81 | N22 | N23 | 100 | |
| R82 | N23 | VDD_V45_100_250 | 5 | |
| | | : | | |

Fig. 4C

| | | | | |
|---|---|---|---|---|
| R21 | N1 | N2 | 20 | (1) |
| R22 | N2 | VDD_V45_100_250 | 5 | (2) |
| R81 | N22 | N23 | 100 | (3) |
| R82 | N23 | VDD_V45_100_250 | 5 | (4) |

SYSTEM AND METHOD FOR EXTRACTING PARASITIC ELEMENTS

INCORPORATION BY REFERENCE

This patent application claims a priority on convention based on Japanese Patent application No. 2009-214894. The disclosure thereof is incorporated herein by reference.

BACKGROUND OF THE INVENTION

1. Field of the Invention

The present invention relates to analysis of a semiconductor integrated circuit, and particularly to a technique for extracting parasitic capacitances and resistances.

2. Description of Related Art

In the technical fields for extracting parasitic capacitances and resistances, delay calculation, and SI (crosstalk) analysis, the effect of noise on a power supply interconnection is known. However, the effect of power supply noise on a signal delay problem was negligible in terms of precision since power supply voltage is high and parasitic capacitances between power supply interconnections and resistances are small.

However, the effect of a voltage drop due to power supply noise on delay calculation and timing design increases greater so that it has not become negligible in association with increase in the parasitic capacitances and resistances due to increase in an operation frequency and miniaturization in a manufacturing process, and adoption of a lower power supply voltage. In the delay calculation, it is required to consider a delay variation due to the effect of noise on a power supply line as well as on signal interconnection, although the effect of the power supply noise has been neglected in terms of precision. Therefore, it is necessary to extract a parasitic capacitance and resistance of the power supply interconnection.

Patent Literature 1 discloses a conventional method of extracting parasitic elements. FIG. 1 is a flow chart for a conventional method of extracting parasitic capacitances and resistances in order to simulate performance of an integrated circuit for delay analysis.

In a step 201, interconnections in an integrated circuit are extracted, namely, a net is extracted. A parasitic capacitance of each of interconnections is measured by using a software tool such as "Vampire" commercially available from Candace Design Systems, Inc. (in California). The interconnections represent wiring lines or a net between electronic elements such as transistors in an integrated circuit.

In a step 202, an estimation value of a maximum resistance of each interconnection in the integrated circuit is calculated. That is, the estimation value of the maximum resistance of each interconnection in the integrated circuit is calculated by using the following equation (1):

$$Rest=(intCap \times metalRes)/(minMetalCap \times minWireWidth) \quad (1)$$

where Rest is the estimated maximum resistance of the interconnection, intCap is the extracted parasitic capacitance value, metalRes is an estimated resistivity of the interconnection, minMetalCap is an estimated minimum parasitic capacitance value of the interconnection, and minWireWidth is an estimated shortest length of the interconnection. The estimated resistivity, the minimum parasitic capacitance value, and the shortest length of each interconnection can be obtained from a resistivity, a parasitic capacitance, and a length of the interconnection which are dependent on a manufacturing process.

In a step S203, an estimated delay is calculated by using the following equation (2) for each interconnection in the integrated circuit:

$$Delayest=0.5 \times Rest \times intCap+Rest \times Cgate \quad (2)$$

where Delayest is an estimated delay of a signal from one point to another point in the interconnection, and Cgate is an estimated total parasitic capacitance of gates of transistors connected to the interconnection. The estimated total parasitic capacitance is obtained from the manufacturing process.

In another example, the estimated delay in the interconnection can be determined by calculating an estimated parasitic capacitance and an estimated resistance of the interconnection mentioned below.

The parasitic capacitance of the interconnection can be estimated by using the following equation (3):

$$Capest=(maxDist \times maxMetalCap) \quad (3)$$

where Capest is the estimated parasitic capacitance of the interconnection, maxDist is an estimated value of a maximum distance between the interconnections, and maxMetalCap is an estimated maximum parasitic capacitance of the interconnection. The estimated maximum distance can be acquired from a layout, and the maximum parasitic capacitance of the interconnection can be acquired from the manufacturing process.

The resistance of the interconnection can be estimated by using the following equation (4):

$$Rest=(maxDist \times metalRes)/minWireWidth \quad (4)$$

where Rest is the estimated resistance of the interconnection, metalRes is an estimated resistivity of the interconnection, and minWireWidth is an estimated shortest length of the interconnection.

With the use of the calculation results of the equations (3) and (4), the estimated delay of the interconnection in the integrated circuit can be calculated by using the following equation (5):

$$Delayest=0.5 \times Rest \times Capest+Rest \times Cgate \quad (5)$$

where Delayest is the estimated delay of the interconnection, and Cgate is the estimated total parasitic capacitance of gates of transistors connected to the interconnection.

In a step 204, important interconnections are selected. In this example, an interconnection in which the estimated delay of a signal calculated in the step 203 exceeds a threshold value selected in advance is selected and identified as the important interconnection.

In a step 205, a transistor driving the important interconnection, and a transistor receiving a signal propagated on the important interconnection are identified.

In a step 206, a net list including a list of transistors in the integrated circuit is simplified into a small net list by selecting the transistors identified in the step 205.

In a step 207, layout layers connected to the important interconnections are extracted from the entire layout of the integrated circuit. That is to say, all the layers which are electrically connected to the important interconnections are extracted. For example, via-contacts connected to the important interconnections are extracted. In another example, metal contacts relevant to the important interconnections are extracted. The layout layers connected to the important interconnections are extracted by using various software tools available as products such as Vampire. The coordinates of them indicate locations of transistors in the entire layout of the integrated circuit. The coordinates can be used to relate the respective parasitic capacitances and resistances in the layout layers extracted as mentioned below, to specific transistors in the simplified net list.

In a step 208, the respective parasitic capacitances and resistances of the extracted layout layers are extracted. That is to say, measurement is possible by using various software tools commercially available such as Vampire.

In a step 209, the respective extracted parasitic capacitances and resistances of the layout layers are related to the specific transistors in the simplified net list. As mentioned above, the coordinates of a transistor connected to the layout layer extracted in the step 207 can be acquired. By using such coordinates, the respective extracted parasitic capacitances and resistances of the extracted layout layers can be related to the transistors connected to the extracted layout layers in the simplified net list. In a step 210, analysis can be performed.

CITATION LIST

[Patent Document 1]: JP 2005-537566A

SUMMARY OF THE INVENTION

In the above example, the important interconnection is selected by performing simple calculation from data such as the maximum resistance and parasitic capacitance estimated in each interconnection. The extraction of parasitic capacitances and resistances is performed only from the selected important interconnection. As for interconnections which are not identified as the important interconnections, extraction and analysis are not performed. By the above method, a calculation process is sped up.

In an uppermost interconnection layer, a power supply interconnection is generally connected to a power supply pad as an external input, and connected to interconnections arranged in a wide area. The power supply interconnection in the uppermost layer is connected from a power supply interconnection in an interconnection layer immediately beneath the uppermost layer through a via-contact. In the same way, the power supply interconnection is routed to a lowermost interconnection layer. Ultimately, the power supply interconnection is connected to power supply terminals of individual active elements. The power supply interconnection thus has a complicated structure in the lower layer.

As mentioned above, a demand is present for extraction of the parasitic capacitances and resistances of power supply interconnections. In the conventional technique, complicated and wide-area structure of power supply lines is all regarded as an interconnection when the parasitic capacitances and resistances of the power supply interconnections are extracted. Either the simple extraction or the detailed extraction needs to be performed for the parasitic capacitance and resistance of each interconnection. In the conventional technique, a power supply interconnection is selected as the important interconnection and the detailed extraction is performed for the parasitic capacitances and resistances. Therefore, the effect of power supply interconnections can be considered in detail. However, a complicated interconnection route of a power supply interconnection structure has to be calculated every interconnection layer and junction. In this way, this technique requires much execution time and memory capacitance.

In an aspect of the present invention, a parasitic element extracting system includes: a classifying section configured to classify each of interconnection layers of a layout structure of a semiconductor device into one of an upper interconnection layer and an lower interconnection layer based on a predetermined criterion; a marker producing section configured to generate a marker to indicate a via-contact connecting the upper interconnection layers and the lower interconnection layers; an upper layer parasitic element list producing section configured to generate an upper layer parasitic element list by extracting parasitic elements in the upper interconnection layers based on a first criterion; a lower layer parasitic element list producing section configured to generate a lower layer parasitic element list by extracting parasitic elements in the lower interconnection layers based on a second criterion which is different from the first criterion; and a parasitic element list producing section configured to generate a parasitic element list of the layout by combining the upper layer parasitic element list and the lower layer parasitic element list by using the markers.

In another aspect of the present invention, an extracting method of parasitic elements, is achieved by classifying each of interconnection layers of a layout structure of a semiconductor device into one of an upper interconnection layer and an lower interconnection layer based on a predetermined criterion; by generating a marker to indicate a via-contact connecting the upper interconnection layers and the lower interconnection layers; by generating an upper layer parasitic element list by extracting parasitic elements in the upper interconnection layers based on a first criterion; by generating a lower layer parasitic element list by extracting parasitic elements in the lower interconnection layers based on a second criterion which is different from the first criterion; and by generating a parasitic element list of the layout by combining the upper layer parasitic element list and the lower layer parasitic element list by using the markers.

According to the present invention, it is possible to shorten a calculation time for extracting parasitic values of parasitic elements from layout data while keeping a precision.

BRIEF DESCRIPTION OF THE DRAWINGS

The above and other objects, advantages and features of the present invention will be more apparent from the following description of certain embodiments taken in conjunction with the accompanying drawings, in which:

FIGS. 4A to 4C are an example of a net list extracted from a layout of an upper layer; an example a net list extracted from a layout of a lower layer; and an example of a net list in which the upper layer and the lower layer are combined;

DESCRIPTION OF PREFERRED EMBODIMENTS

Hereinafter, a parasitic element extracting system according to the present invention will be described in detail with reference to the attached drawings.

Figure 5:
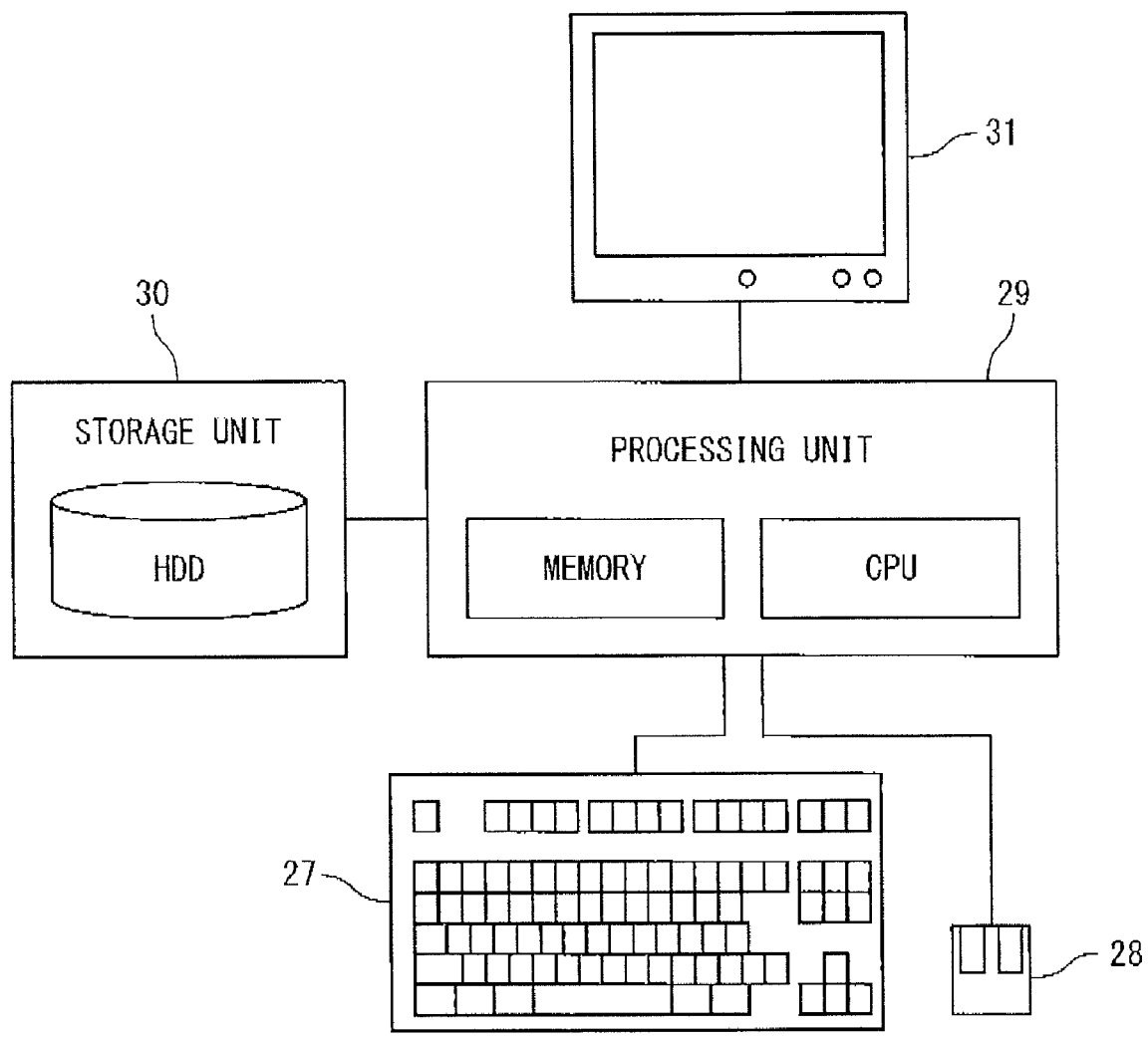
FIG. 5 is a block diagram showing a hardware configuration example of a technique for extracting parasitic capacitances and parasitic resistances according to the embodiment.

FIG. 5 is a block diagram showing a hardware configuration of the parasitic element extracting system according to an embodiment of the present invention. A keyboard 27 has character keys, numeric keys, and function instructing keys, for performing various key entries. A mouse 28 is used to input positional data indicated by a mouse cursor. Input units like the keyboard 27 and the mouse 28 are used to instruct execution of a control program which is for performing a parasitic element extracting method according to the embodiment of the present invention and which is installed from a recording medium such as a floppy disk, a CD and DVD. Alternatively, the control program may be downloaded from a network such as the Internet.

A processing unit 29 such as a microcomputer including a CPU and a memory (a RUM and a RAM) controls the entire system. The processing unit 29 executes a process of extracting parasitic capacitances and resistances, a process of storing the extraction results of the parasitic capacitances and resistances in a storage unit 30 in the form of files, a process of loading the extraction results of the parasitic capacitances and resistances stored in the storage unit 30 into an internal memory, and a process of displaying the extraction results of the parasitic capacitances and resistances onto a display 31, by executing the control program. The storage unit 30 such as an HOD (hard disk unit) stores layout data, and the extraction results of the parasitic capacitances and resistances. The display unit 31 such as a CRT and an LCD displays the extraction results of the parasitic capacitances and resistances, with various messages.

Figure 8:
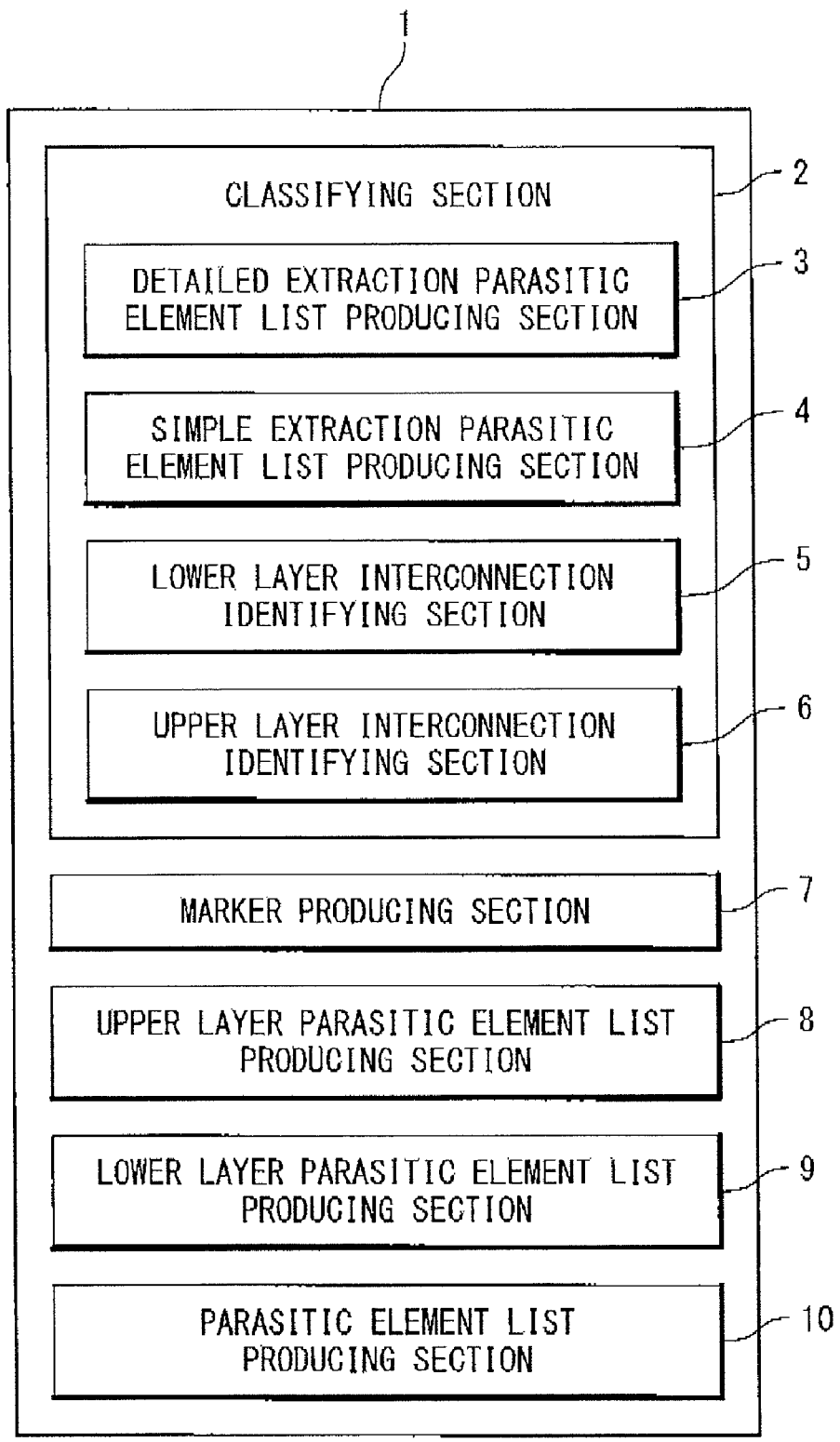
FIG. 8 is a block diagram showing structure of a parasitic element extracting system.

FIG. 8 is a functional block diagram of the parasitic element extracting system. The parasitic element extracting system 1 includes a classifying section 2, a marker producing section 7, an upper-layer parasitic element list producing section 8, a lower-layer parasitic element list producing section 9, and a parasitic element list producing section 10. The classifying section 2 includes a detailed extraction parasitic element list producing section 3, a simple extraction parasitic element list generating section 4, a lower-layer interconnection identifying section 5, and an upper-layer interconnection identifying section 6. These functional blocks are realized by the processing unit 29 reading out and executing the control program stored in the storage unit 30 and operating in accordance with a procedure described in the control program.

Figure 1:
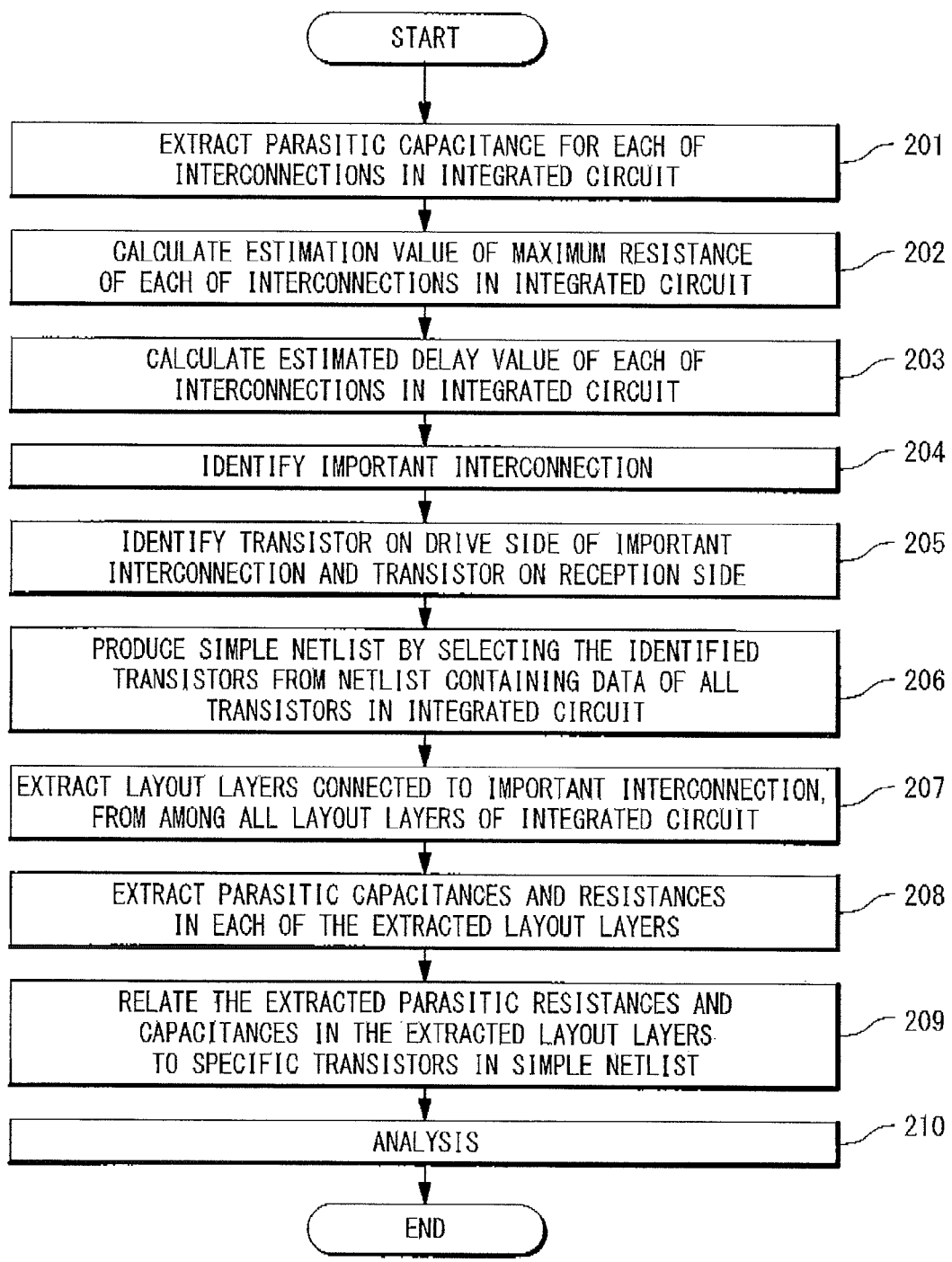
FIG. 1 is a flow diagram for extracting parasitic capacitances and parasitic resistances according to a reference example.
Figure 2:
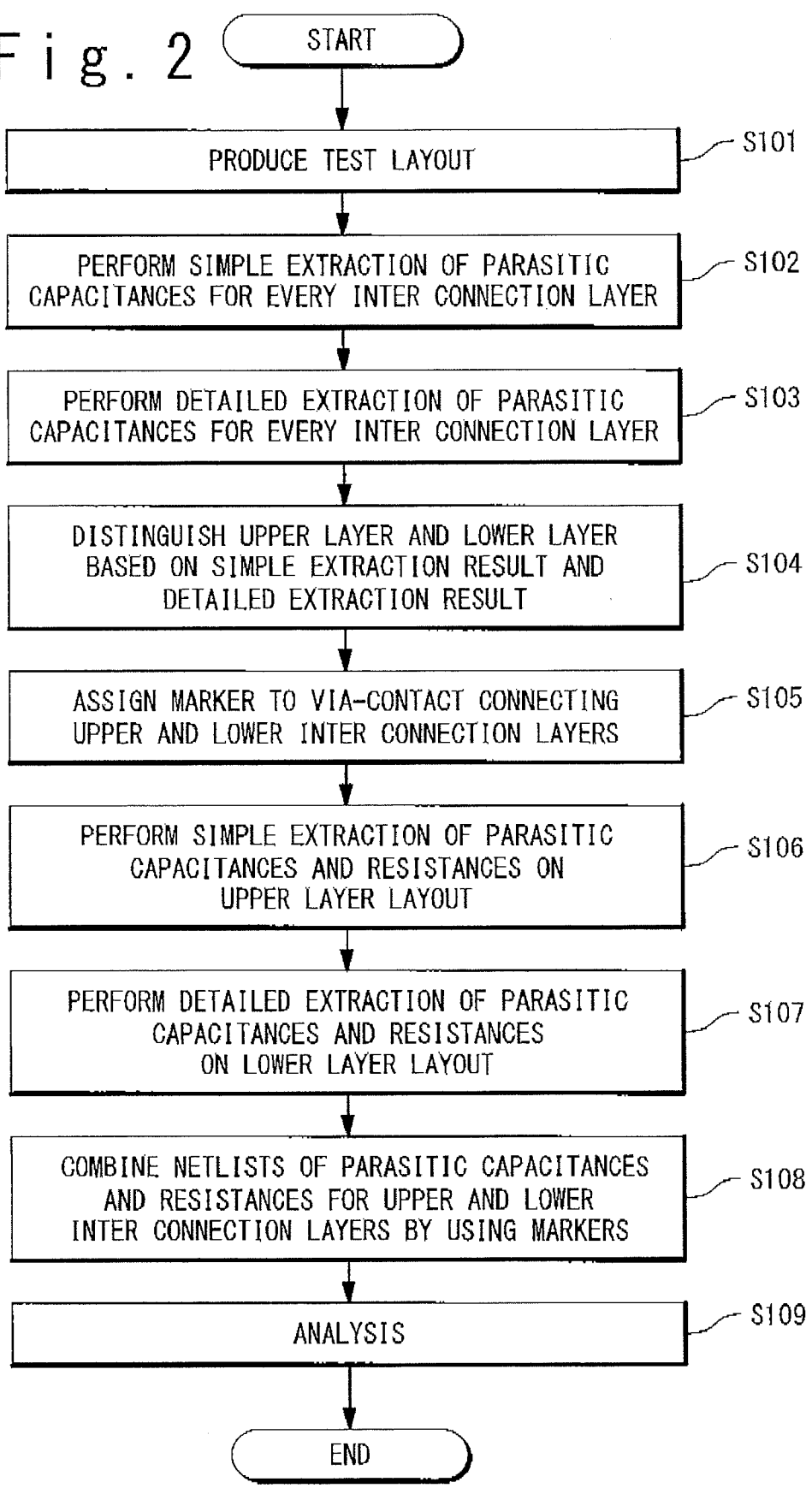
FIG. 2 is a flow diagram for extracting parasitic capacitances and parasitic resistances according to an embodiment.

FIG. 2 is a flow chart showing an operation of the parasitic element extracting system according to a first embodiment of the present invention. In steps S101 to S104, a difference between a parasitic capacitance obtained through simple extraction and a parasitic capacitance obtained through detailed extraction is obtained for each interconnection layer. A layer in which the difference is greater than a predetermined value is determined to be a lower interconnection layer and a layer in which the difference is smaller than the predetermined value is determined to be an upper interconnection layer.

Firstly, in the step S101, after data for specifying a manufacturing process for a product as an analysis target are inputted, the parasitic element extracting system 1 generates and produces a test layout having interconnection layers formed by an equivalent, manufacturing process and saves the test layout in the storage unit 30. The generation of the test layout may employ existing layout data of an actual product firstly manufactured by the manufacturing process. When there is no existing data, a layout newly generated for a trial may be employed as the test layout. The test layout includes data of interconnections in accordance with a design criterion including an interconnection width and an interconnection pitch in the manufacturing process. As for interconnection layers, it is preferable that all the interconnection layers to be used are included. There is no constraint on a circuit configuration of interconnection layers and the number of elements.

Next, in the steps S102 to S104, the classifying section 2 classifies the interconnection layers included in the test layout into an upper interconnection layer and a lower interconnection layer based on the predetermined criterion.

In the step S102, the simple extraction parasitic element list producing section 4 performs simple extraction of parasitic capacitances for the interconnections included in the test layout generated in the step S101 for each of the interconnection layers. The simple extraction of parasitic capacitances is performed as follows. In an ordinary detailed extraction of parasitic capacitances (extraction according to a first method), adjacent interconnections within a range of predetermined criterion and interconnections in the upper and lower interconnection layers are considered in accordance with a design criterion of interconnections in the same interconnection layer as the concerned interconnection. On the other hand, in the simple extraction of parasitic capacitances (extraction according to a second method), the numbers of adjacent interconnections in the same interconnection layer and interconnections in the upper and lower interconnection layers as targets of calculation are greatly reduced compared with the ordinary method. This reduction is performed in accordance with a predetermined reduction criterion without reducing precision excessively.

In the step S103, the detailed extraction parasitic element list producing section 3 performs detailed extraction of parasitic capacitances for the interconnections targeted for simple extraction calculation in the step S102 for each of the interconnection layers.

The process of the steps S101 to S103 depends on the manufacturing process. In this process, the structure, shape, and size of each interconnection are uniquely determined based on the manufacturing process. For this reason, if the same process as a process which has been performed once applied to the same test layout, the previous results can be used. In such a case, it is possible to skip or eliminate the process of the steps S101 to S103.

In a step S104, the following process is executed. In the step S102, a value of parasitic capacitance is calculated by performing simple extraction of a parasitic capacitance for each interconnection. By using this value for the simple extraction, a simple extraction total value as a total of the parasitic capacitances is calculated for the interconnection layers. In the step S103, the value of parasitic capacitance is calculated by performing detailed extraction of a parasitic capacitance for each of the interconnections. By using this value for the detailed extraction, a detailed extraction total value as a total of the parasitic capacitances is calculated for the interconnection layers. In addition, a difference between the simple extraction total value and the detailed extraction total value is calculated for each interconnection layer.

The lower interconnection layer identifying section 5 determines that the interconnection layer having the difference equal to or more than a predetermined threshold value is a lower interconnection layer, for each interconnection layer.

The upper interconnection layer identifying section determines that the interconnection layer having the difference smaller than the predetermined threshold value is an upper interconnection layer, for each interconnection layer.

In manufacturing of a semiconductor device, a minimum interconnection width and a minimum interconnection interval can be used in a lowermost layer. In the upper interconnection layers than the lowermost layer, wider interconnection widths and interconnection intervals are used for alignment precision with lower layers. That is to say, the interconnection intervals and interconnection widths are narrow in the lower interconnection layer, compared with upper interconnection layer. Therefore, the numbers of adjacent interconnections and upper and lower interconnections to be considered in calculating the parasitic capacitance and resistance are increased in lower interconnection layers. For this reason, a boundary between the upper interconnection layer and the lower interconnection layer is determined uniquely by using a preset threshold value.

In a step S105, a marker producing section generates a marker for actual design data targeted for extraction of the parasitic capacitance and resistance to indicate a via-contact for connecting an upper interconnection layer and a lower interconnection layer. All the via-contacts connecting the upper interconnection layer and the lower interconnection layer through the boundary determined in the step S104 are extracted as boundary via-contacts by using the actual design data. Then, the marker as an identifier for individually identifying each via-contact is assigned to every boundary via-contact in accordance with naming rules determined in advance.

Figure 3:
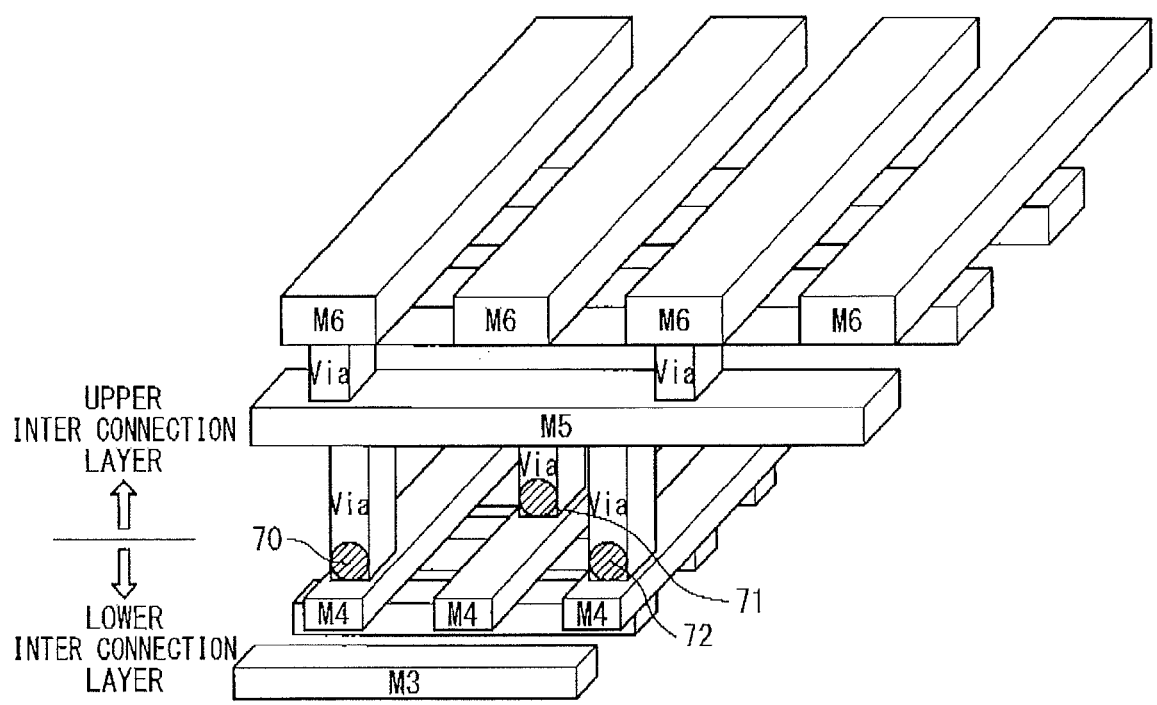
FIG. 3 is a layout example of VIAs and markers between upper interconnections and lower interconnections according to the embodiment.

FIG. 3 is a layout example of via-contacts and markers between the upper interconnection layer and the lower interconnection layer according to the present invention. In FIG. 3, interconnections M3 and M4 are recognized as lower interconnections and interconnections M5 and M6 are recognized as upper interconnections. Markers 70, 71, and 72 are added to boundary via-contacts connected to the interconnections M4 and M5. The markers can be stored by being kept during process execution time as data managed by a tool for executing the process of FIG. 2. Alternatively, the markers may be saved by being attached to graphic data of a target layout, making it possible to keep the markers during a period other than process execution time by the tool. As for the naming rules of a marker, (a name of a net)_(a name of a via-contact) _(X coordinate)_(Y coordinate), which is a set of data, is generated for each marker, so that the marker can be identified. By using such data, a via-contact can be identified at the time of integration of net lists. The control flow proceeds to a step S106 after the marker is provided to every boundary via-contact.

In the step S106, the upper-layer parasitic element list producing section 8 generates a list of upper-layer parasitic elements by extracting parasitic elements in an upper interconnection layer based on a first criterion (simple extraction criterion) stored in advance. The simple extraction of the parasitic capacitances and resistances is performed on each interconnection in each of the interconnection layers identified as the upper interconnection layers by using the actual design data used in the step S105. The result is outputted as a net list of values of the parasitic capacitances and resistances for each node. The net list includes the markers provided in the step S105, as connection data.

In a step S107, the lower-layer parasitic element list producing section 9 generates a list of lower-layer parasitic elements by extracting parasitic elements in the lower interconnection layers based on a second criterion (detailed extraction criterion), which is different from the first criterion and stored in advance. The detailed extraction of the parasitic capacitances and resistances is performed on each interconnection in each of the interconnection layers identified as the lower interconnection layers by using the actual design data used in the step S105. The result is outputted as a net list of values of the parasitic capacitances and resistances for each node. The net list also includes the markers which are provided in the step S105 and the same as the step S106, as connection data.

In a step S108, the parasitic element list producing section 10 receives the upper-layer parasitic element lists, which are the net lists of upper interconnection layers obtained in the step. S106, and the lower-layer parasitic element list, which are the net lists of lower interconnection layers obtained in the step S107. The parasitic element list producing section 10 combines the upper-layer parasitic element list and the lower-layer parasitic element list, to generate a parasitic element list of layout data of the actual design.

FIGS. 4A to 4C are examples of net lists using the markers of the present invention. FIG. 4A is an example of net lists extracted from a layout of upper interconnection layers. FIG. 4B is an example of net lists extracted from a layout of lower interconnection layers. FIG. 4C is an example of a combination resultant net list after the net lists of upper layers and the net lists of lower layers are combined.

Markers that separates a layout of upper interconnection layers and a layout of lower interconnection layers are "VDD_V45_100_250" described in (2) of FIG. 4A and (4) of FIG. 4B. In FIG. 4C, "VDD_V45_100_250" of (2) and "VDD_V45_100_250" (4) of the combination resultant net list are regarded as the same node. Ultimately, the parasitic capacitance data relevant to "VDD_V45_100_250" obtained in the layout of upper interconnection layers and the parasitic capacitance data relevant to "VDD_V45_100_250" obtained in the layout of lower interconnection layers are integrated and outputted as a parasitic capacitance value of the interconnection.

In a step S109, delay calculation and SI analysis are performed based on the combination resultant net list.

The parasitic element extracting system according to the present embodiment has a function of separating a layout into the upper interconnection layers and the lower interconnection layers, a function of generating the markers for via-contacts connecting the upper interconnection layers and the lower interconnection layers through the boundary, a function of extracting the parasitic capacitances and resistances by different methods between the upper interconnection layers and the lower interconnection layers, and a function of combining extraction results of the parasitic capacitances and resistances of the upper interconnection layers and the lower interconnection layers based on the markers.

In the conventional technique, the detailed extraction of the parasitic capacitance and resistance need to be performed on every power supply interconnection. On the other hand, in the present embodiment, the simple extraction of the parasitic capacitances and resistances is performed on the power supply interconnections of the upper interconnection layers. As a result, it is possible to shorten a time for extraction of the parasitic capacitances and resistances.

Figure 6:
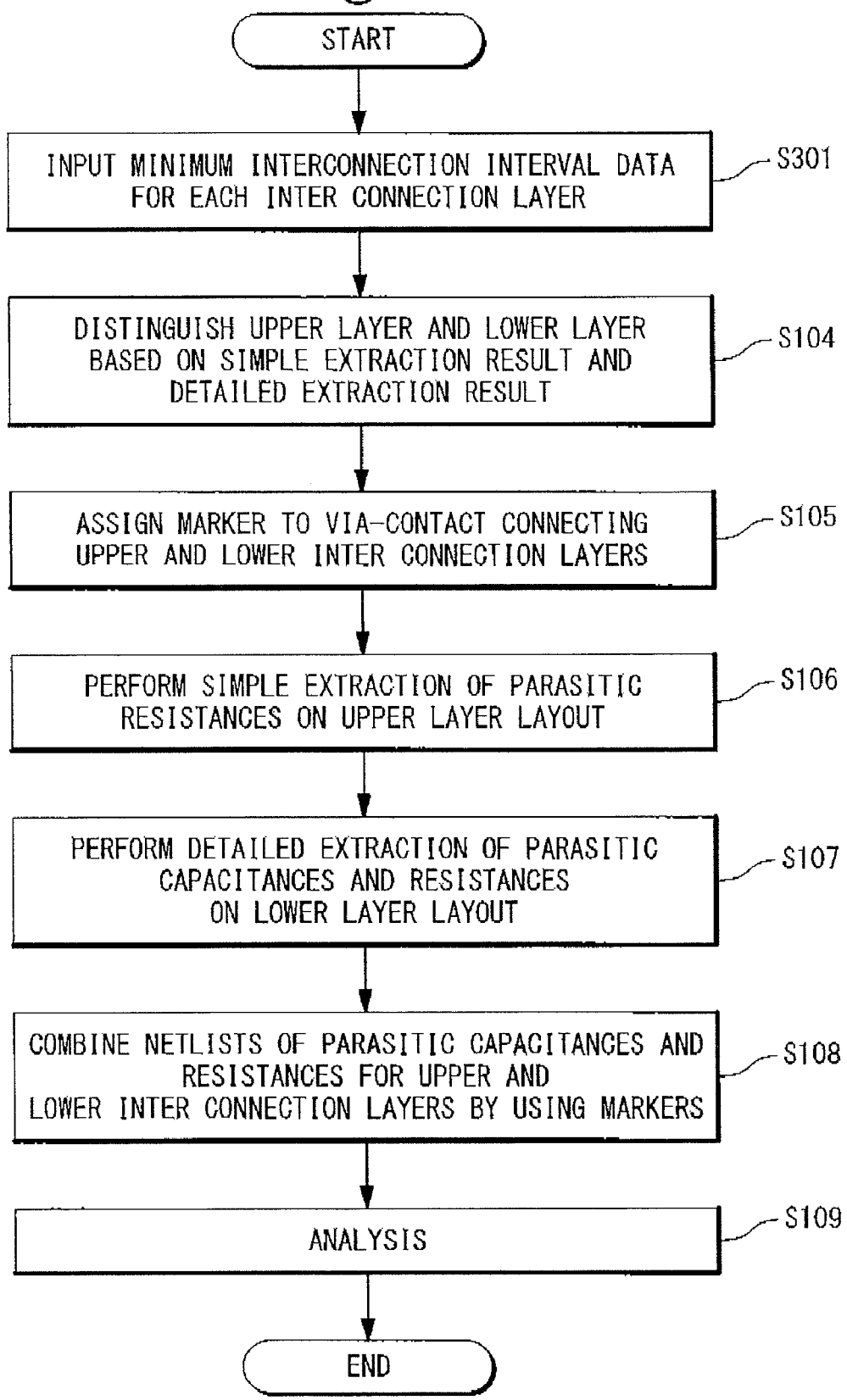
FIG. 6 is a flow diagram for extracting parasitic capacitances and parasitic resistances according to the second embodiment.

FIG. 6 is a flow chart in an operation of extracting the parasitic capacitances and resistances according to a second embodiment of the present invention. The steps S101, S102, and S103 of the first embodiment are replaced by a step S301 in the second embodiment. A flow of the second embodiment will be described with reference to FIG. 6.

In the step S301, the minimum interconnection interval uniquely determined for each interconnection layer based on the interconnection structure determined depending on the manufacturing process, is inputted from an input unit. In the step S104, a preset threshold value is compared with the minimum interconnection interval of each interconnection layer inputted in the step S301. The upper interconnection layer identifying section 6 identifies a layer in which the minimum interconnection interval is greater than the preset threshold value, as the upper interconnection layer. The lower interconnection layer identifying section 5 identifies a layer in which the minimum interconnection interval is equal to or smaller than the preset threshold value, as the lower interconnection layer. The process of a step 105 and the subsequent is the same as in the first embodiment.

In the second embodiment, the minimum interconnection interval in each interconnection layer in the interconnection structure uniquely determined depending on the manufacturing process, is used for identification of the upper interconnection layers and the lower interconnection layers. In general, the minimum interconnection interval depending on the manufacturing process is narrower in the lower interconnection layer and wider in the upper interconnection layer. Additionally, the values of parasitic capacitances and resistances become greater as the interconnection interval becomes narrower, and a resultant difference between the detailed extraction method and the simple extraction method becomes greater. For this reason, a comparison between the preset threshold value and the minimum interconnection interval in each interconnection layer can be used in place of the recognition method (based on a difference in parasitic capacitance between the detailed extraction method and the simple extraction method in each interconnection layer) of the first embodiment. According to the present embodiment, it is possible to shorten a time for the identifying process of the upper interconnection layer and the lower interconnection layer. Therefore, a time for obtaining the parasitic capacitances and resistances can be reduced.

Figure 7:
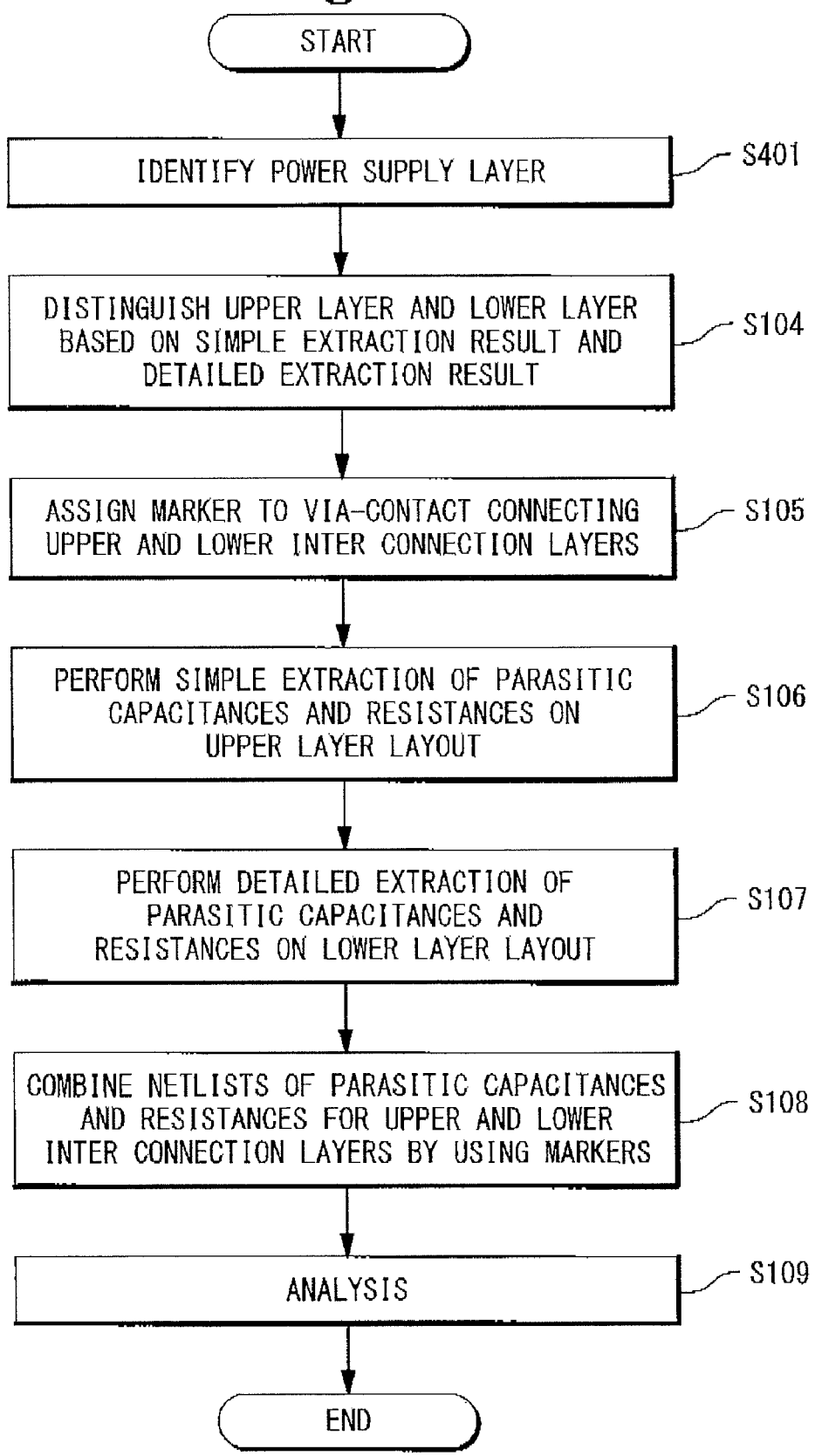
FIG. 7 is a flow diagram for extracting parasitic capacitances and parasitic resistances according to the third embodiment.

FIG. 7 is a flow chart in an operation for extracting the parasitic capacitances and resistances according to a third embodiment of the present invention. The steps S101, S102, and S103 in the first embodiment are replaced by a step S401 in the third embodiment. A flow of the third embodiment will be described with reference to FIG. 7.

In the step S401, actual design data and a of a power supply interconnection name for identifying a power supply interconnection are inputted. Then, an interconnection layer including only power supply interconnections, and an interconnection layer including power supply interconnections and signal interconnections are identified. In the step S104, the upper interconnection layer identifying section 6 identifies the interconnection layer including only power supply interconnections as the upper interconnection layer. The lower interconnection layer identifying section 5 recognizes an interconnection layer including both of power supply interconnections and signal interconnections as the lower interconnection layer. The process of a step S105 and the subsequent is the same as in the first embodiment.

In the third embodiment, the power supply interconnections and the signal interconnections are identified and the interconnection layer including only the power supply interconnections is identified as the upper layer, in interconnection structure uniquely determined depending on the manufacturing process. Through this process, the identifying process of the upper interconnection layer and the lower interconnection layer can be performed in a short time, making it possible to reduce a time for obtaining the entire parasitic capacitance and parasitic resistance.

The effects which can be obtained by the above-mentioned embodiments will further be described. First, a TAT for extracting the parasitic capacitances and resistances is improved. The reason is as follows. In the conventional technique, only important interconnections are targets for extraction of the parasitic capacitances and resistances when the simple extraction calculation is performed. Extraction of the parasitic capacitances and resistances of the other unimportant interconnections is not performed so that the execution time is reduced. In this conventional technique, however, a case that the power supply interconnection is selected as the important interconnection is inevitable. For this reason, each interconnection layer with a complicated interconnection route and branches of the interconnection route has to be calculated, requiring longer execution time and more memory capacitance.

The power supply interconnection has complicated interconnection route compared to a signal interconnection route. Therefore, in extracting the parasitic capacitances and resistances, calculation relevant to the power supply interconnection route takes almost all the calculation time. In the embodiments of the present invention, calculation for the power supply interconnections can greatly be simplified in the upper interconnection layers, making it possible to greatly shorten the execution time. Consequently, it is possible to eliminate the problem of the conventional technique that an execution time of the power supply interconnections is huge.

Second, high coverage can be obtained when the parasitic capacitances and resistances are extracted. In the conventional technique, unimportant interconnections are excluded from targets for calculation. On the other hand, in the embodiments of the present invention, the parasitic capacitances and resistances are analyzed by extracting values of all the interconnections. Therefore, higher coverage is secured compared with the conventional technique.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A parasitic element extracting system comprising:
   a classifying section configured to classify each of interconnection layers of a layout structure of a semiconductor device into one of an upper interconnection layer and an lower interconnection layer based on a predetermined criterion;
   a marker producing section configured to generate a marker to indicate a via-contact connecting said upper interconnection layers and said lower interconnection layers;
   an upper layer parasitic element list producing section configured to generate an upper layer parasitic element list by extracting parasitic elements in said upper interconnection layers based on a first criterion;
   a lower layer parasitic element list producing section configured to generate a lower layer parasitic element list by extracting parasitic elements in said lower interconnection layers based on a second criterion which is different from said first criterion; and
   a parasitic element list producing section configured to generate a parasitic element list of said layout by combining said upper layer parasitic element list and said lower layer parasitic element list by using said marker.

2. The parasitic element extracting system according to claim 1, wherein said classifying section 5 comprises:

a detailed extraction parasitic element list producing section configured to generate a detailed extraction parasitic element list by extracting said parasitic elements from said each interconnection layer of said layout by a first method;

a simple extraction parasitic element list producing section configured to generate a simple extraction parasitic element list by extracting said parasitic elements from said each interconnection layer by a second method which is less in a calculation amount than said first method;

a lower interconnection layer identifying section configured to identify said each interconnection layer as said lower interconnection layer when a difference between a parasitic element value indicated in said detailed extraction parasitic element list of said each interconnection layer of said layout and a parasitic element value indicated in said simple extraction parasitic element list thereof is equal to or larger than a predetermined threshold value; and an upper interconnection layer identifying section configured to identify said each interconnection layer as said upper interconnection layer when, the difference between the parasitic element value indicated in said detailed extraction parasitic element list of said each interconnection layer of said layout and the parasitic element value indicated in said simple extraction parasitic element list thereof is smaller than the predetermined threshold value.

3. The parasitic element extracting system according to claim 1, wherein said classifying section comprises:

a lower interconnection layer identifying section configured to identify said each interconnection layer as said lower interconnection layer when a minimum interconnection interval in said each interconnection layer of said layout is equal to or smaller than a predetermined interval value; an an upper interconnection layer identifying section configured to identify said each interconnection layer as said upper interconnection layer when the minimum interconnection interval in said each interconnection layer of said layout is larger than the predetermined interval value.

4. The parasitic element extracting system according to claim 1, wherein said classifying section comprises:

an upper interconnection layer identifying section configured to identify said each interconnection layer as said upper interconnection layer when said each interconnection layer of said layout includes only power supply interconnections; and a lower interconnection layer identifying section configured to identify said each interconnection layer as said lower interconnection layer when said each interconnection layer of said layout includes any interconnection in addition to the power supply interconnections.

5. An extracting method of parasitic elements, comprising:

classifying each of interconnection layers of a layout structure of a semiconductor device into one of an upper interconnection layer and a lower interconnection layer based on a predetermined criterion;

generating a marker to indicate a via-contact connection said upper interconnection layers and said lower interconnection layers;

generating an upper layer parasitic element list by extracting parasitic elements in said upper interconnection layers based on a first criterion;

generating a lower layer parasitic element list by extracting parasitic elements in said lower interconnection layers based on a second criterion which is different from said first criterion; and generating, using a computer, a parasitic element list of said layout by combining said upper layer parasitic element list and said lower layer parasitic element list by using said marker.

6. The extracting method according to claim 5, wherein said classifying comprises:

generating a detailed, extraction parasitic element list by extracting said parasitic elements from said each interconnection layer of said layout by a first method;

generating a simple extraction parasitic element list by extracting said parasitic elements from said each interconnection layer by a second method which is less in a calculation amount than said first method;

identifying said each interconnection layer as said lower interconnection layer when a difference between a parasitic element value indicated in said detailed extraction parasitic element list of said each interconnection layer of said layout and a parasitic element value indicated in said simple extraction parasitic element list thereof is equal to or larger than a predetermined threshold value; and identifying said each interconnection layer as said upper interconnection layer when the difference between the parasitic element value indicated in said detailed extraction parasitic element list of said each interconnection layer of said layout and the parasitic element value indicated in said simple extraction parasitic element list thereof is smaller than the predetermined threshold value.

7. The extracting method according to claim 5, wherein said classifying comprises:

identifying said each interconnection layer as said lower interconnection layer when a minimum interconnection interval in said each interconnection layer of said layout is equal to or smaller than a predetermined interval value; and identifying said each interconnection layer as said upper interconnection layer when the minimum interconnection interval in said each interconnection layer of said layout is larger than the predetermined interval value.

8. The extracting method according to claim 5, wherein said classifying comprises:

identifying said each interconnection layer as said upper interconnection layer when said each interconnection layer of said layout includes only power supply interconnections; and identifying said each interconnection layer as said lower interconnection layer when said each interconnection layer of said layout includes any interconnection in addition to the power supply interconnections.

9. A non-transitory computer-readable tangible storage medium in which a computer-executable program code is stored to realize an extracting method of parasitic elements, wherein said extracting method comprises:

classifying each of interconnection layers of a layout structure of a semiconductor device into one of an upper interconnection layer and a lower interconnection layer based on a predetermined criterion;

generating a marker to indicate a via-contact connecting said upper interconnection lavers and said lower interconnection layers;

generating an upper layer parasitic element list by extracting parasitic elements in said upper interconnection layers based on a first criterion;

generating a lower layer parasitic element list by extracting parasitic elements in said lower interconnection layers based on a second criterion which is different from said first criterion; and generating a parasitic element list of said layout by combining said upper layer parasitic element list and said lower layer parasitic element list by using said marker.

10. The non-transitory computer-readable tangible storage medium according to claim 9, wherein said classifying comprises:

generating a detailed extraction parasitic element list by extracting said parasitic elements from said each interconnection layer of said layout by a first method;

generating a simple extraction parasitic element list by extracting said parasitic elements from said each interconnection layer by a second method which is less in a calculation amount than said first method;

identifying said each interconnection layer as said lower interconnection layer when a difference between a parasitic element valueindicated in said detailed extraction parasitic element list of said each interconnection layer of said layout and a parasitic element value indicated in said simple extraction parasitic element list thereof is equal to or larger than a predetermined threshold value; and identifying said each interconnection layer as said upper interconnection layer when the difference between the parasitic element value indicated in said detailed extraction parasitic element list of said each interconnection layer of said layout and the parasitic element value indicated in said simple extraction parasitic element list thereof is smaller than the predetermined threshold value.

11. The non-transitory computer-readable tangible storage medium according to claim 9, wherein said classifying comprises:

identifying said each interconnection layer as said lower interconnection layer when a minimum interconnection interval in said each interconnection layer of said layout is equal to or smaller than a predetermined interval value; and identifying said each interconnection layer as said upper interconnection layer when the minimum interconnection interval in said each interconnection layer of, said layout is larger than the predetermined interval value.

12. The non-transitory computer-readable tangible storage medium according to claim 9, wherein said classifying comprises:

identifying said each interconnection layer as said upper interconnection layer when said each interconnection layer of said layout includes only power supply interconnections; and identifying said each interconnection layer as said lower interconnection layer when said each interconnection layer of said layout includes any interconnection in addition to the power supply interconnections.

* * * * *